(12) United States Patent
Kummeth et al.

(10) Patent No.: US 6,264,533 B1
(45) Date of Patent: Jul. 24, 2001

(54) ABRASIVE PROCESSING APPARATUS AND METHOD EMPLOYING ENCODED ABRASIVE PRODUCT

(75) Inventors: Charles R. Kummeth, Hudson, WI (US); Michael J. Muilenburg, Minneapolis, MN (US); Gary B. Forsberg, Eagan, MN (US); Robert J. Streifel, Woodbury, MN (US); Daniel B. Pendergrass, Jr., Mendota Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/322,559

(22) Filed: May 28, 1999

(51) Int. Cl.$^7$ .............................. B24B 49/00; B24B 51/00
(52) U.S. Cl. ................................................ 451/8; 451/296
(58) Field of Search ................... 451/5, 6, 8, 9, 451/10, 28, 41, 63, 285, 287, 288, 259, 268, 269, 296

(56) References Cited

U.S. PATENT DOCUMENTS

| | | |
|---|---|---|
| 5,012,989 | 5/1991 | Whyte, Jr. et al. . |
| 5,152,917 | 10/1992 | Pieper et al. . |
| 5,452,150 | 9/1995 | Henneberger et al. . |
| 5,514,028 | 5/1996 | Ali et al. . |
| 5,643,044 | 7/1997 | Lund . |
| 5,661,616 | 8/1997 | Tran et al. . |
| 5,791,969 | 8/1998 | Lund . |
| 5,897,424 | 4/1999 | Evans et al. . |

FOREIGN PATENT DOCUMENTS

| | | | |
|---|---|---|---|
| 35 18 902 A1 | 11/1986 | (DE) | ............................. B24B/45/00 |
| 41 11 016 C1 | 7/1992 | (DE) | ............................. B24B/51/00 |
| 0 447 084 A1 | 9/1991 | (EP) | ............................. B24B/13/06 |
| 0630820 A1 | 6/1994 | (EP) . | |
| 0 881 552 A2 | 12/1998 | (EP) | ............................. G05B/19/12 |

Primary Examiner—Derris H. Banks

(57) ABSTRACT

An apparatus and method for abrasively processing an article involves the use of an abrasive product provided with a machine discernable pattern representative of information of varying types. The pattern is read while the abrasive product moves relative to the article, and is used to control the movement of the abrasive product relative to the article. The pattern may include one or more of a machine discernable electrical characteristic, optical characteristic, topographic characteristic or magnetic characteristic. Reading the pattern may involve one or more of electrically, optically, mechanically or magnetically reading the machine discernable pattern provided on the abrasive product. The pattern may include one or more of indicia, protrusions, depressions, holes, voids, color or pigment variations, bar codes, magnetic transitions or periodic markings. The pattern may include one or more of indexing information, servo information, alignment information or abrasive product identification information. Closed-loop servo control of abrasive product movement may be effected using the servo/indexing pattern information. The abrasive product may constitute a movable pad and an abrasive slurry. The pad may be moved in a controlled manner relative to the article such that the pad and the abrasive slurry abrasively contact the article. The pattern provided on the pad may be read subsequent to a cleaning operation. An information system may be used to store various types of data derived, in part, from use of the abrasive product pattern information. The stored data may be used for a variety of identification, tracking, accounting, inventory, handling, and statistical purposes.

83 Claims, 7 Drawing Sheets

ABRASIVE PROCESSING APPARATUS AND METHOD EMPLOYING ENCODED ABRASIVE PRODUCT

FIELD OF THE INVENTION

This invention relates generally to abrasive processing of articles, and more particularly, to an apparatus and method for abrasively processing articles using an abrasive product encoded with a machine readable pattern representative of product identification information, indexing information, servo information, and the like.

BACKGROUND OF THE INVENTION

Various types of automated abrasion and polishing machinery have been developed to abrasively process articles of varying composition and configuration. In the semiconductor industry, for example, conventional chemical-mechanical planarization (CMP) machinery provides for automated planarization and polishing of semiconductor wafers. An example of an automatic wafer polishing apparatus is described in U.S. Pat. Nos. 5,643,044 and 5,791,969 issued to Lund, each of which is incorporated herein by reference in its entirety.

Conventional automated polishing machinery, such as that described in the above-identified patents, typically employs a computer-based control system to control the general polishing process. The servo control process used in such machinery is typically based on the shaft speed of a drive motor that drives a roll of abrasive material through the machinery. The shaft speed is compared to a programmed value, and a voltage or current supplied to the motor is adjusted by the servo control mechanism to equilibrate the sensed shaft speed with the programmed speed value.

Using this approach, only a indirect measure of abrasive roll speed may be obtained. Such an approach fails to account for a number of factors that can significantly affect the computation of the actual speed of the abrasive material relative to the wafer or article subject to polishing. Moreover, such conventional servoing approaches provide for only a limited degree of precision when attempting to position a particular region of abrasive material into contact with a given article during the polishing process. These and other limitations inherent in conventional automated polishing systems may have a profound negative impact on the ability to process and finish certain articles, such as semiconductor wafers, with a high level of precision.

Although conventional polishing approaches provide for some degree of automation, many of these approaches require human intervention at various steps. For example, an operator must typically verify, through manual means, that a particular type of abrasive product is appropriate for processing a particular type of article. An error made by the operator in this context will generally have deleterious results, typically resulting in damage to, or destruction of, costly articles and undesirable processing down-time. Other aspects of conventional polishing and abrasion processing methodologies are similarly limited in terms of automation, such as the use of partially automated or non-automated inventory systems, machine performance diagnostic systems, abrasive product/article tracking systems, and the like.

There exists a need for a system and method for abrasively processing articles that provide enhanced automation and data processing capabilities. There exists a particular need for an improved approach to controlling movement of an abrasive product relative to one or more articles during abrasion processing. There exists a further need for an integrated information system that provides for a variety of data acquisition and manipulation capabilities presently unavailable using conventional abrasion or polishing machinery. The present invention fulfills these and other needs.

SUMMARY OF THE INVENTION

The present invention is directed to an apparatus and method for abrasively processing an article. An abrasive product is provided with a machine discernable pattern representative of information which may vary in terms of type and content. The machine discernable pattern is read while the abrasive product moves relative to the article, and is used to initiate a machine operation, such as an operation associated with controlling the movement of the abrasive product relative to the article. The machine discernable pattern may include one or more of a machine discernable electrical characteristic, optical characteristic, topographic characteristic or magnetic characteristic. Reading the machine discernable pattern may involve one or more of electrically, optically, mechanically or magnetically reading the machine discernable pattern provided on the abrasive product.

The machine discernable pattern may include one or more of indicia, protrusions, depressions, holes, voids, color or pigment variations, bar codes, magnetic transitions or periodic markings. The machine discernable pattern may include a first pattern portion and a second pattern portion, wherein the first pattern portion exhibits a machine discernable characteristic different from a machine discernable characteristic exhibited by the second pattern portion.

The machine discernable pattern may include one or more of indexing information, servo information, alignment information or abrasive product identification information. Indexing information may be included in the pattern and used to compute one or more locations of the abrasive product at which the abrasive product contacts a given article. Servo information may also be included as part of the machine discernable pattern, alone or in combination with indexing information, and may be used to control abrasive product movement, such as a rate or direction at which the abrasive product moves relative to the article. The machine discernable pattern may further include alignment information from which changes in abrasive product alignment relative to the article may be effected.

Abrasive product identification information included in the machine discernable pattern may be used to verify that a particular abrasive product is appropriate for abrasively processing a given article. Movement of the abrasive product may be halted in response to a failure to verify that the abrasive product is appropriate for abrasively processing the subject article. The machine discernable pattern may include information identifying a location of one or more defective regions of the abrasive product. The defect location information may be used to control abrasive product movement so as to avoid contact between the defective regions and the article.

The abrasive product may constitute a web having a fixed length or, alternatively, may be a continuous web. The web may, for example, constitute a three dimensional, composite, fixed web suitable for planarizing a semiconductor wafer. The abrasive product may also constitute a movable pad and an abrasive slurry. The pad may be moved in a controlled manner relative to the article such that the pad and the abrasive slurry abrasively contact the article. The machine discernable pattern provided on the pad may be read subsequent to a cleaning operation. Depending on the configuration of the abrasive processing apparatus, the machine discernable pattern may be read at a first reading location prior to the abrasive product (e.g., pad and abrasive slurry) contacting the article and read at a second reading location subsequent to the abrasive product contacting the article, such as following a cleaning procedure. The article subject to abrasive processing may comprise a silicon article, a glass article, a ceramic article, a composite article, a wood article or a metallic article. The article may, for example, comprise a silicon wafer, geranium wafer or gallium arsenide wafer, and associated structures related to the fabrication of semiconductor devices.

Another embodiment of the present invention concerns an abrasive product for abrasively processing an article. The abrasive product includes a base layer having a first surface and a second surface. An abrasive material is disposed on the first surface. A machine discernable pattern is provided on either one or both of the first and second surfaces for use in generating a control signal for controlling movement of the abrasive material relative to the article. The first or second surface may constitute an edge of the abrasive product. The machine discernable pattern may include one or more of a machine discernable electrical characteristic, optical characteristic, topographic characteristic or magnetic characteristic. One or more machine detectable tabs may be affixed to the abrasive product, wherein a first pattern portion is provided on either one or both of a first or second surface of the abrasive product, and a second pattern portion is provided on one or more of the tabs. The tabs may extend over an edge of the abrasive product. The machine discernable pattern may be provided on a label affixable to either one or both of the first or second surfaces of the abrasive product.

An apparatus for abrasively processing an article in accordance with the principles of the present invention includes a support for supporting an abrasive product having a machine discernable pattern provided thereon. A mounting fixture positions the article into and out of contact with the abrasive product. An actuator is provided to move the abrasive product relative to the article. A detector detects the machine discernable pattern provided on the abrasive product, and a controller controls the movement of the abrasive product relative to the article using the machine discernable pattern.

The detector may include one or more of an electrical detector, an optical detector, a mechanical detector or a magnetic detector. The detector detects one or more of indexing information, servo information, alignment information or abrasive product identification information provided in the machine discernable pattern. Using indexing information provided in the machine discernable pattern, the controller computes a location of the abrasive product at which the abrasive product abrasively contacts the article. The controller may further control a rate at which the abrasive product moves relative to the article using servo information included in the machine discernable pattern. The servo information may also be used by the controller to control a direction of abrasive product movement relative to the article. Alignment information may further be included in the machine discernable pattern which may be used by the controller to maintain proper alignment of the abrasive product relative to the article.

Another aspect the present invention concerns a method of acquiring information concerning processing of one or more articles. A machine discernable pattern provided on an abrasive product is read, and a database is accessed to obtain an identification of the abrasive product using the machine discernable pattern. Various types of data associated with processing of the identified abrasive product is produced and stored in the database. The stored data may be used for a variety of identification, tracking, accounting, inventory, handling, and statistical purposes.

The method may involve disabling abrasive processing of a subject article if a query of the database indicates that using a particular abrasive product to process the subject article would be inappropriate. The database may also store inventory data associated with one or both of abrasive products and the articles residing at one or more processing facilities. Data associated with the throughput of articles processed using a particular abrasive product may be acquired and stored in the database. Various types of processing data may be communicated to local and/or remotely located processors.

A system for acquiring information concerning processing of articles by use of an abrasive processing apparatus includes a controller coupled to the abrasive processing apparatus. A detector is coupled to the controller and detects a machine discernable pattern provided on an abrasive product used by the abrasive processing apparatus to abrasively process the article. A host processor is coupled to memory which stores various types of processing data. An interface couples the host processor to the controller of the abrasive processing apparatus. The host processor receives identification information associated with the abrasive product from the controller and stores the abrasive product identification information in the memory. The host processor or the controller converts the machine discernable pattern to a corresponding abrasive product identity using the abrasive product identification information.

The host processor may be situated locally or remotely with respect to the controller. The memory may include a plurality of physical or virtual memory devices, and each of the memory devices may be situated proximately or remotely with respect to other ones of the memory devices. The host processor may operate on data stored in the memory to perform a number of identification, tracking, accounting, inventory, handling, and statistical functions.

For example, the identity of the article to be processed using the abrasive processing apparatus may be stored in the memory, and the host processor associates the article identity with the abrasive product identification information to verify the appropriateness of processing the article using the abrasive product. The host processor communicates a disable signal to the controller in response to unsuccessfully verifying the appropriateness of processing the article using the abrasive product. The controller disables abrasive processing of the article in response to the disable signal. The article identity may be input into the memory using a variety of input devices, including a keyboard, a voice recognition device, an optical scanning device, or a bar code reader for example.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
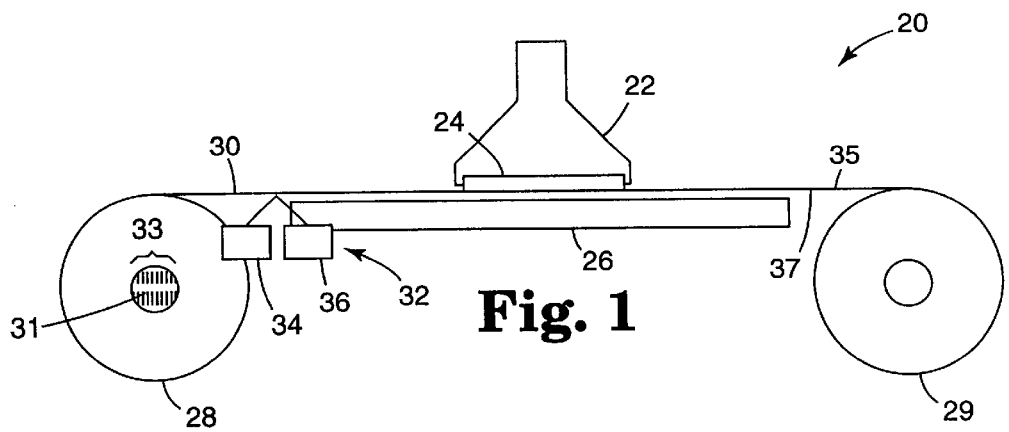
FIGS. 1 and 2 illustrate abrasive processing apparatuses which employ a web of abrasive material encoded with information in accordance with the principles of the present invention.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

Referring to the drawings, and more particularly to FIG. 1, there is illustrated an abrasive processing apparatus 20 which employs an abrasive product for purposes of abrasively processing articles placed in contact with the abrasive product. In the embodiment depicted in FIG. 1, the abrasive product constitutes a web provided with a layer of abrasive material. It will be understood that the term abrasive product as contemplated within the context of the present invention embraces many types of abrasive product constructions of varying configurations and materials, and is not limited to a web-type product configuration or to the other abrasive product configurations specifically described herein.

In particular, an abrasive product suitable for use in accordance with the principles of the present invention includes those having a continuous configuration or a belt-type configuration. A discrete abrasive product having a circular or plate-like configuration is also contemplated. It will be understood that abrasive products having other geometries are also contemplated.

Further, an abrasive product suitable for use in accordance with the principles of the present invention may be implemented as a three dimensional, composite abrasive web. Another suitable abrasive product construction includes a pad, such as an elastomeric pad, in combination with an abrasive slurry. An abrasive product comprising a lapping or burnishing film, alone or in combination with a textured substrate, is also contemplated, such as a lapping film product described in U.S. Pat. No. 5,897,424, which is hereby incorporated herein by reference in its entirety. Accordingly, an abrasive product intended for use in the context of the present invention is not limited to the abrasive product forms specifically described herein.

In accordance with the embodiment shown in FIG. 1, an abrasive web 30 is introduced to the abrasive processing apparatus 20 from a feed roll 28, moves in an axial direction through the transport mechanism of apparatus 20 during abrasive processing, and is wound onto a take-up roll 29. Abrasive web 30 may include abrasive composites similar to those described in U.S. Pat. No. 5,152,917 to Pieper et al., which is hereby incorporated by reference in its entirety.

In general operation, an article 24 to be processed using abrasive processing apparatus 20 is situated in fixture 22. Fixture 22 is typically controlled to move one or more articles 24 into and out of contact with abrasive web 30 during abrasive processing. The surface 37 of web 30 devoid of abrasive material moves above the surface of a table 26. The table 26 resists forces imparted to the web 30 by downward movement of fixture 22 as the articles 24 are forced against web 30.

Fixture 22 typically moves in a substantially circular or elliptical orbital manner while forcing the articles 24 against abrasive web 30. The degree to which the articles 24 are abrasively processed by apparatus 20 is controllable, such as by appropriately controlling the rate and direction of web movement, the movement of fixture 22, and the contact force between the articles 24 and the abrasive surface 35 of web 30. Abrasive web 30, for example, may be controlled to move in an incremental manner at fixed length or variable length steps. Abrasive web 30 may also be controlled to move in a uniform, continuous manner, such as at a specified rate, during abrasive treatment of a subject article 24. Alternatively, or in addition, the subject articles 24 may be held stationary by fixture 22 while the abrasive web 30 is moved backward and forward in a controlled manner.

In accordance with the principles of the present invention, a surface of abrasive web 30, such as a surface 37 devoid of abrasive material, is provided with a pattern which may be sensed by reader device 32. The surface 35 which includes abrasive material may also be provided with a pattern readable by reader device 32. Further, one or both edges of abrasive web 30 may be provided with the pattern. It will be appreciated that one or more surfaces of abrasive web 30 may be provided with a pattern which may be sensed by reader device 32. It is noted that different surfaces of abrasive web 30 may be provided with different patterns which, in turn, may be representative of different types of information.

The pattern provided on one or more surfaces of abrasive web 30 may be representative of various types of information useful in identifying the characteristics of abrasive web 30 and in performing a variety of abrasive processing functions and information gathering/processing operations. As will be discussed in greater detail hereinbelow, the information encoded on the abrasive web 30 may indicate the abrasive product name, manufacturer, date of manufacture, roll number, lot number, and other identifying information. The patterned information may, in addition, include index patterns which are used to determine the position of abrasive web 30 relative to a reference location, such as a start of roll location. Further, the machine discernable information pattern, when read and interpreted, may be used to initiate a machine operation, such as initiating raising of the polishing fixture 22 shown in FIG. 1 upon reading an end of roll pattern or performing a cleansing operation of abrasive web 30 and/or table 26 upon reading an index pattern at every foot of web length, for example.

The information pattern may also include servo patterns which are used to facilitate control of abrasive web movement. For example, a servo control system of the abrasive processing apparatus 20 may control the velocity, acceleration, and direction of the abrasive web 30, and may also provide for continuous or stepped control of abrasive web movement. Further, the servo patterns may be used alone or in conjunction with indexing patterns to locate and re-locate a particular region of abrasive web 30 for contacting a particular article with a high degree of precision. Alignment information may also be patterned on the abrasive web 30 along one or more lanes of the web 30. For example, one or more lanes of alignment patterns may be provided on the web 30 substantially parallel to the longitudinal axis of the web. The alignment patterns may be used to adjust the position of the abrasive web 30 to maintain a desired directional orientation as the web 30 progresses through the abrasive processing apparatus 20.

The patterned information provided on abrasive web 30 may take a variety of forms. In general, the patterned information may exhibit a characteristic which is discernable by a machine, device or other automated implementation. The pattern provided on abrasive web 30 may, for example, include an electrical characteristic, optical characteristic, topographical characteristic, magnetic characteristic, or other characteristic or combination of characteristics that may be discernable by an automated implementation. For example, reader device 32 shown in the Figures may discern one or more patterns provided on abrasive web 30 by electrically, optically, mechanically or magnetically reading the pattern.

As non-limiting examples, the pattern provided on abrasive web 30 may be fabricated by printing a pigmented ink or dye on the web 30; by forming a pattern of holes through web 30; by forming a patterns of pits or grooves in the surface of web 30; by forming the pattern as an integral part of the web, such as by introduction or omission of a colorant; by affixing preprinted label materials to web 30; by affixing tabs which differ in terms of conductivity or optical properties with respect to web 30; or by forming a pattern of magnetic transitions on web 30. Corresponding to each web marking technique is a variety of techniques for interrogating the markings. Such interrogation techniques may include the use of optical transmission, optical reflectance, electrical conductivity, mechanical probes, fluidic probes, magnetic reading elements, and the like.

The location of the patterns may be present in several forms, including, but not limited to, down-web patterns in single or multiple lanes across web 30; patterns along one or more edges of web 30; patterns along the inner surface of the roll core 31, on a cap of roll core 31, or as part of the web packaging material. A single web 30 may bear one or more patterns in more than one location (e.g., cross-web or down-web) to accommodate more than one type of sensing device or to extend the utility of the patterns. By way of example, and as discussed previously, patterns of similar or different configuration may be located in multiple lanes across web 30 or on other pairs of web 30, and separate sensors may be used to read the patterns for performing a number of functions, including data collection, indexing, servoing, aligning or other functions, such as optimization of abrasive machine performance and detecting web tension, for example.

In accordance with one embodiment of the present invention, abrasive processing apparatus 20 includes a reader device 32 which is shown mounted below the abrasive web 30 in FIG. 1. Reader device 32 may comprise an optical sensor 36 and an illumination source 34. The illumination source 34 and optical sensor 36 cooperate to sense optically distinguishable transitions provided on abrasive web 30. Reader device 32, for example, may include a bar code reader that senses a series of parallel bars of varying width and spacing, such as the bars of bar code 56 depicted in FIG. 3A, in a manner known in the art.

In accordance with another embodiment, reader device 32 may constitute a scanning device that reads indicia preprinted on abrasive web 30. The indicia may include alphanumeric characters which may be interpreted using optical character recognition or other suitable techniques. The indicia may further include a combination of alphanumeric characters and other characters and markings, such as vertical, horizontal, diagonal, and other lines and symbols presented in various geometric configurations.

Figure 2:
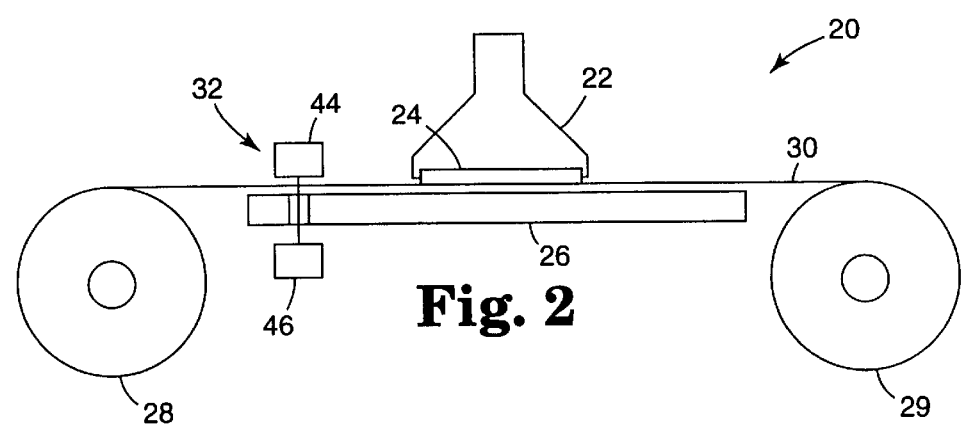

Concerning the embodiment illustrated in FIG. 2, reader device 32 may include a transmitter 44 and a detector 46 which cooperate on opposite sides of abrasive web 30 to sense optically distinguishable transitions provided thereon. In accordance with this embodiment, the information pattern may include a series of holes through the abrasive web 30. Alternatively, the pattern may include a series of depressions or portions of web 30 which are sufficiently translucent to permit a requisite amount of light to pass from the transmitter 44 to the detector 46. Variations in opacity or transmissivity of web 30 may be detected by tandem use of the transmitter 34 and detector 46.

Figure 4:
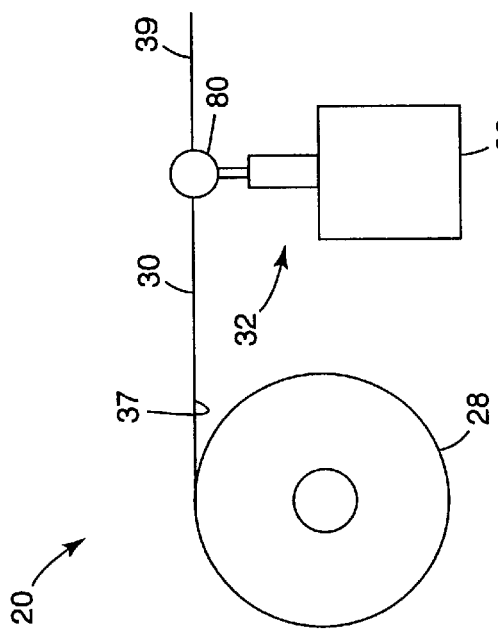
FIG. 4 depicts an embodiment of a reader device for reading an information pattern provided on an abrasive web.
Figure 5:
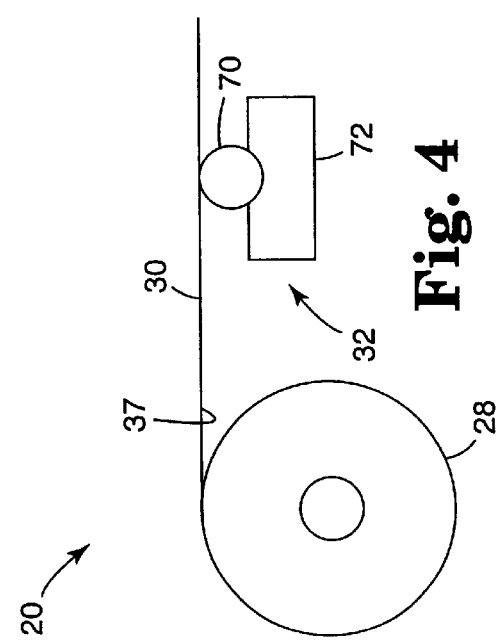
FIG. 5 depicts another embodiment of a reader device for reading an information pattern provided on an abrasive web.

The embodiments illustrated in FIGS. 4 and 5 depict reader devices 32 that mechanically interact with patterns provided on the web 30. In FIG. 4, for example, reader device 32 is situated so as to read topological patterns provided on the lower surface 37 of web 30. Reader device 32 may include a sensor 70 that senses topological variations, such as protrusions and depressions, stamped or otherwise provided on the lower surface 37 of web 30. A transducer assembly 72 may be provided to convert the mechanically sensed pattern information to a corresponding electrical or optical signal. Transducer assembly 72 may further include decoder circuitry for decoding the sensed pattern information. Decoding of the sensed pattern information may alternatively be performed by downstream circuitry or a remotely located processor.

The embodiment of reader device 32 shown in FIG. 5 senses an information pattern provided along an edge 39 of abrasive web 30. The information pattern may be topological variations similar to those discussed above with reference to FIG. 4. The information pattern provided along an edge 39 of abrasive web 30 may also take the form of notches, which provides for a notched edge configuration.

Alternatively, the information pattern of FIGS. 4 and 5 may constitute magnetic transitions encoded on a magnetizable layer or strip running continuously, or on selected portions, along an edge 39 of abrasive web 30. Writing and reading magnetic information to and from the magnetizable layer or edge portions may be effected using various known magnetic recording/writing techniques. In such an embodiment, sensors 70 and 80, which include a magnetic read element such as a thin-film or magneto-resistive read element, need not make physical contact with the edge or other surface of abrasive web 30 encoded with the magnetic information.

Figure 3A:
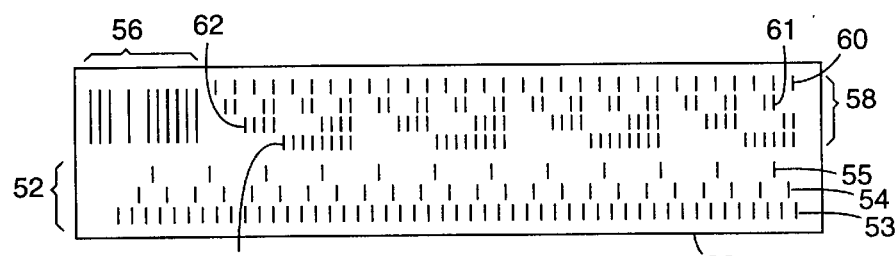
FIGS. 3A and 3B depict patterns of various types of information that may be encoded on and read from an abrasive product in accordance with the principles of the present invention.
Figure 3B:
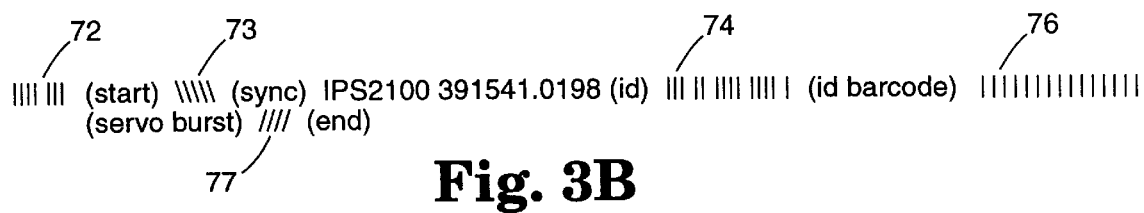
Figure 6:
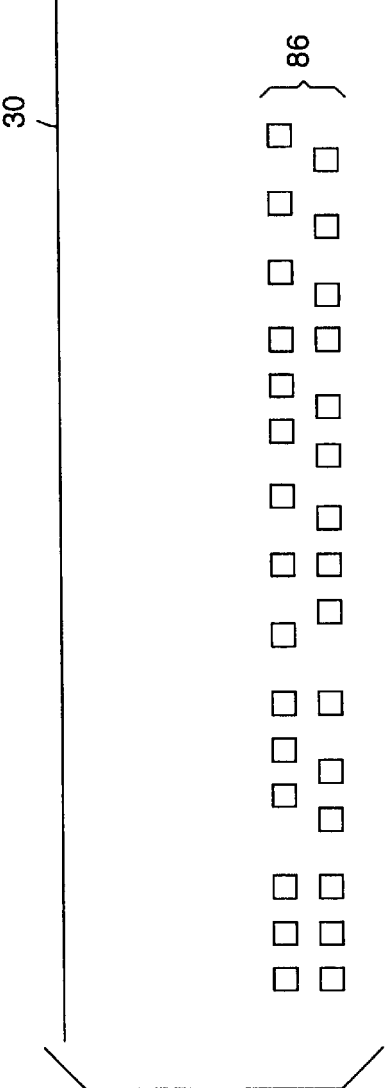
FIG. 6 depicts another pattern of various types of information that may be encoded on and read from an abrasive product in accordance with the principles of the present invention.

FIGS. 3A, 3B, and 6 depict patterns of various types of information that may be encoded on and read from an abrasive web 30 in accordance with the principles of the present invention. FIG. 3A depicts a number of different forms of encoded information which generally utilizes spaced parallel markings. As was discussed above, the markings depicted in FIG. 3A may be representative of printed indicia, topological variations, optically distinguishable variations, magnetic transitions or other form of machine discernable media. It is noted that the patterns shown in FIG. 3A may be provided on any surface of abrasive web 30.

The pattern in region 52 depicts a multiple channel series of markings that may be used for indexing or servoing purposes. In particular, region 52 includes three channels of markings, namely, channels 53, 54, and 55. The markings of the three channels differ in terms of marking density and relative spacing between adjacent markings. The wider spaced markings of channel 55, for example, may indicate large web displacement changes from one marker to the next. The markings of channels 54 and 53 may indicate smaller changes in web displacement. Increasing the number of channels and relative spacing between channel markings provides for increased resolution of the encoding scheme and, therefore, provides for more accurate web displacement computations and greater web movement control.

Region 58 is generally representative of a multiple channel servo pattern which may be used to control movement of the abrasive web 30 during abrasive processing of an article. Region 58 includes four channels of servo markings, namely, channels 60, 61, 62, and 63. The multiple channel pattern at region 58 may also be used to maintain proper alignment as abrasive web 30 moves through the abrasive processing apparatus 20. The servo markings of region 58 are sensed by reader device 32 and are communicated to a processor that interprets the servo data to control abrasive web movement relative to one or more articles during abrasive processing. Those skilled in the art will appreciate that a number of known servo techniques may be employed to appropriately control abrasive web movement in response to servo markings provided on abrasive web 30. The servo markings shown in region 58, for example, may represent a quadrature burst pattern of a configuration often used in the servo art for effecting closed-loop servo control of a process. The servo techniques described in U.S. Pat. Nos. 5,452,150 and 5,661,616, for example, may be adapted for use in an abrasive processing apparatus of the present invention. U.S. Pat. Nos. 5,452,150 and 5,661,616 are incorporated herein by reference it their respective entireties.

By way of example, the servo markings depicted in region 58, alone or in conjunction with the indexing markings of region 52, may be used to control abrasive web movement to present fresh abrasive as intermediate layers of one or more semiconductor wafers are polished. The servo control processor may control abrasive web movement in a continuous or incremental manner. The servo markings may also be used in a calibration procedure to calibrate the servo motor which is used to index the abrasive web 30 through the abrasive processing apparatus. Additionally, the servo markings may be used to reposition abrasive web 30 to a known orientation with respect to the web transport mechanism. Abrasive web 30, for example, may be advanced slowly during processing of a series of wafers, rapidly rewound to position the used portion of web 30 within a cleaning apparatus, and then rapidly advanced to the polishing station to repeat an earlier positioning of web 30.

Indexing marks and identifying markings may be used in combination to more narrowly define the region of abrasive web 30 which was used to polish a specific wafer. For example, the polishing positions associated with processing of a specific article might be described as 23 index marks after the identifying marking 82 feet from the beginning of roll XXX of lot YYY.

A pattern shown in FIG. 3A may further be used to identify the type of abrasive web being used, the identity of the particular web being used, and the portion of web 30 being used to polish a given article, such as a wafer or sequence of wafers. By sensing web marking patterns, the identifying marks may optionally provide the indexing mark function. For example, "start of roll" and "end of roll" identifying marks may also be used to signal break-in and/or changeover modes on a particular abrasive processing machine. Identification markings may alternatively be provided on a core or flange associated with abrasive web 30, such as markings 33 provided on core 31 of feed roll 28 shown in FIG. 1.

FIG. 3B depicts another embodiment of a machine readable pattern which may be used for a variety of control, indexing, and identification purposes. The pattern shown in FIG. 3B includes a start field 72 which indicates the location of abrasive web 30 at which abrasive processing may be initiated. Following start field 72 is a sync field 73 which indicates the beginning of a new block of pattern information. In one embodiment, abrasive web 30 includes one or more frames of pattern information spanning the length of web 30, wherein each of the frames contains a number of blocks. For example, an abrasive web 30 having a useful length of 80 feet may include a single frame of 80 feet and 80 one-foot blocks within the single frame.

The pattern depicted in FIG. 3B further includes an ID field 74 which identifies the abrasive product (e.g., roll number, lot number) and further includes index markings, such as feet and inches index markings. A gap field, which is devoid of markings (not shown), may also be included for servo index calibration purposes. A servo burst pattern 76 is included to facilitate servo indexing and calibration. The servo burst pattern may include ¼ inch to ⅛ inch marks. The size and spacing of the marks may be varied depending on resolution requirements. End of roll markings 77 may be provided near the end of the useful portion of abrasive web 30.

The pattern depicted in FIG. 6 represents a pattern 86 which includes topological variations readable by a mechanical reader device 32 of the type previously described with reference to FIGS. 4 and 5. The pattern 86 may constitute a pattern of holes punched through abrasive web 30 or a series of pits and/or protrusions. Pattern 86 may also be representative of discrete magnetic transitions which are pre-written on abrasive web 30 and read by a magnetic reading device 32 during abrasive processing using web 30.

Figure 7:
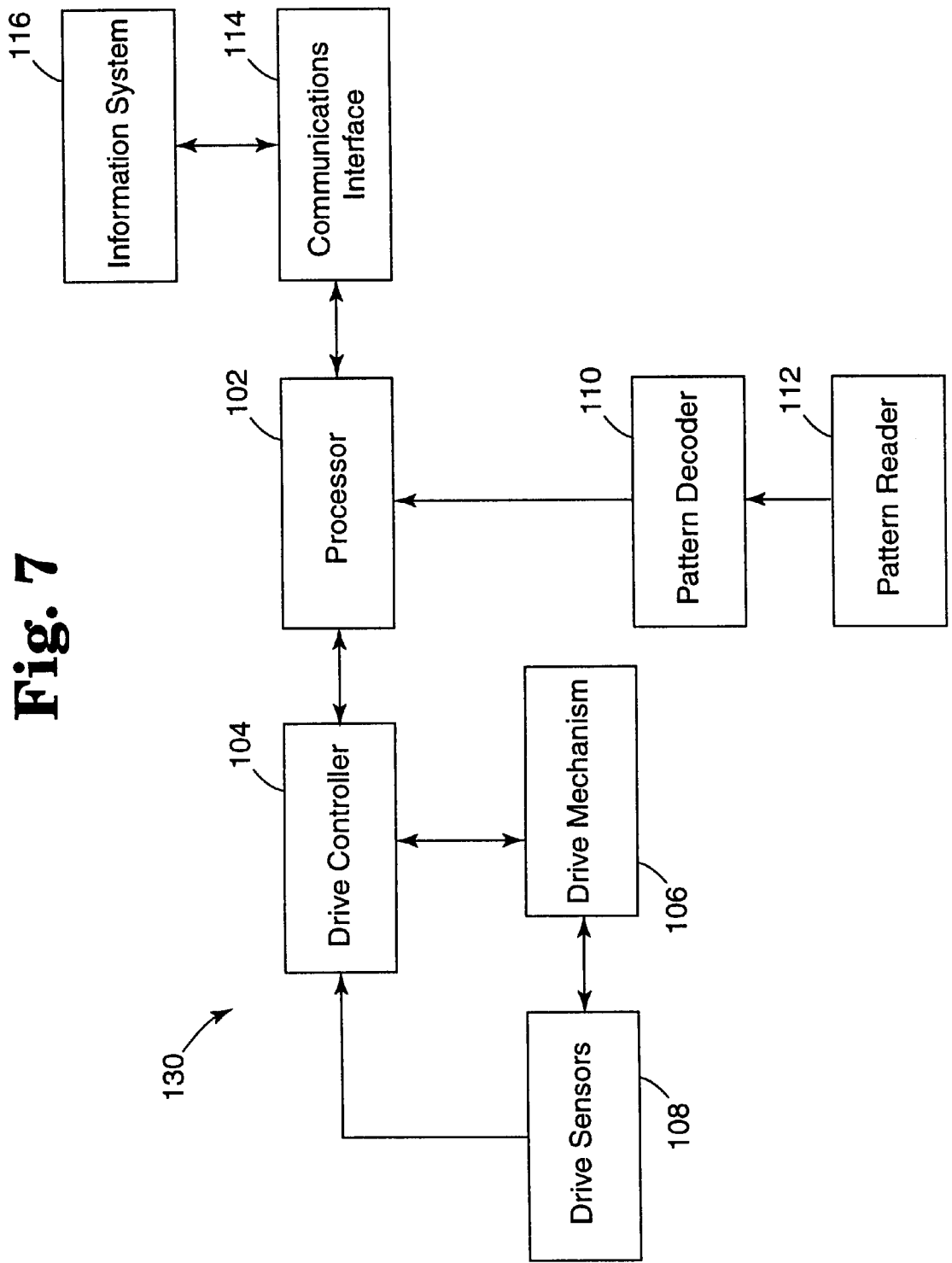
FIG. 7 illustrates an embodiment of a control system which may implemented to control an abrasive processing apparatus in accordance with the principles of the present invention.

Turning now to FIG. 7, there is illustrated an embodiment of a control system 100 which may implemented to control an abrasive processing apparatus 20 in accordance with the principles of the present invention. The system 100 depicted in FIG. 7 includes a main processor 102 which is coupled to a pattern decoder 110. Pattern decoder 110 receives pattern data acquired by a pattern reader 112. Pattern reader 112 may sense or discern an information pattern encoded on an abrasive product having a variety of different forms. For example, pattern reader 112 may be equivalent or similar in terms of form and function to reader device 32 described previously. Pattern decoder 110 transmits signal information corresponding to the pattern read by pattern reader 112 to processor 102.

Processor 102 implements any of a number of known servoing techniques using the servo data received from pattern decoder 110. Processor 102 also obtains abrasive product identity and other related data from pattern decoder 110. The abrasive product identity data may be transmitted to an information system 116 for subsequent processing via a communications interface 114. Information system 116 may be a local or remote system, and may further represent a distributed or networked information system. Communications interface 114 has a form and functionality that accommodates to the data communication and configuration requirements of information system 116. For example, communications interface 114 may be a local area or wide area network card, telephonic interface, microwave or satellite interface, cable network card, peripheral interface card and the like.

Processor 102 implements a servoing methodology in cooperation with drive controller 104. Drive controller 104 is coupled to the drive mechanism of the abrasive processing apparatus and controls the movement of an abrasive product within the abrasive processing apparatus. Drive controller 104 is further coupled to one or more drive sensors 108 that sense various parameters of abrasive processing apparatus operation. Drive mechanism 106 may also receive input signals from one or more drive sensors 108. Alternatively, drive sensors 108 may be directly coupled to processor 102, rather than through drive controller 104. It will be appreciated that processor 102 may be configured to perform all of the functions performed by drive controller 104. Also, it will be appreciated that pattern decoder 110 may be directly coupled to drive controller 104, rather than through processor 102.

Drive controller 104 communicates drive signals to drive mechanism 106 to adjust the operation of the abrasive processing apparatus and, in particular, movement of the abrasive product, such as an abrasive web. Drive controller 104 receives servo and/or indexing data from processor 102 previously decoded by pattern decoder 110. In accordance with one servoing approach, processor 102 receives servo data from pattern decoder 110 and generates a correction signal indicative of a change needed to effect a desired processing speed or direction change. The correction signal generated by processor 102 is transmitted to drive controller 104 which, in turn, transmits a corresponding drive signal to drive mechanism 106 to effect the change.

Figure 8:
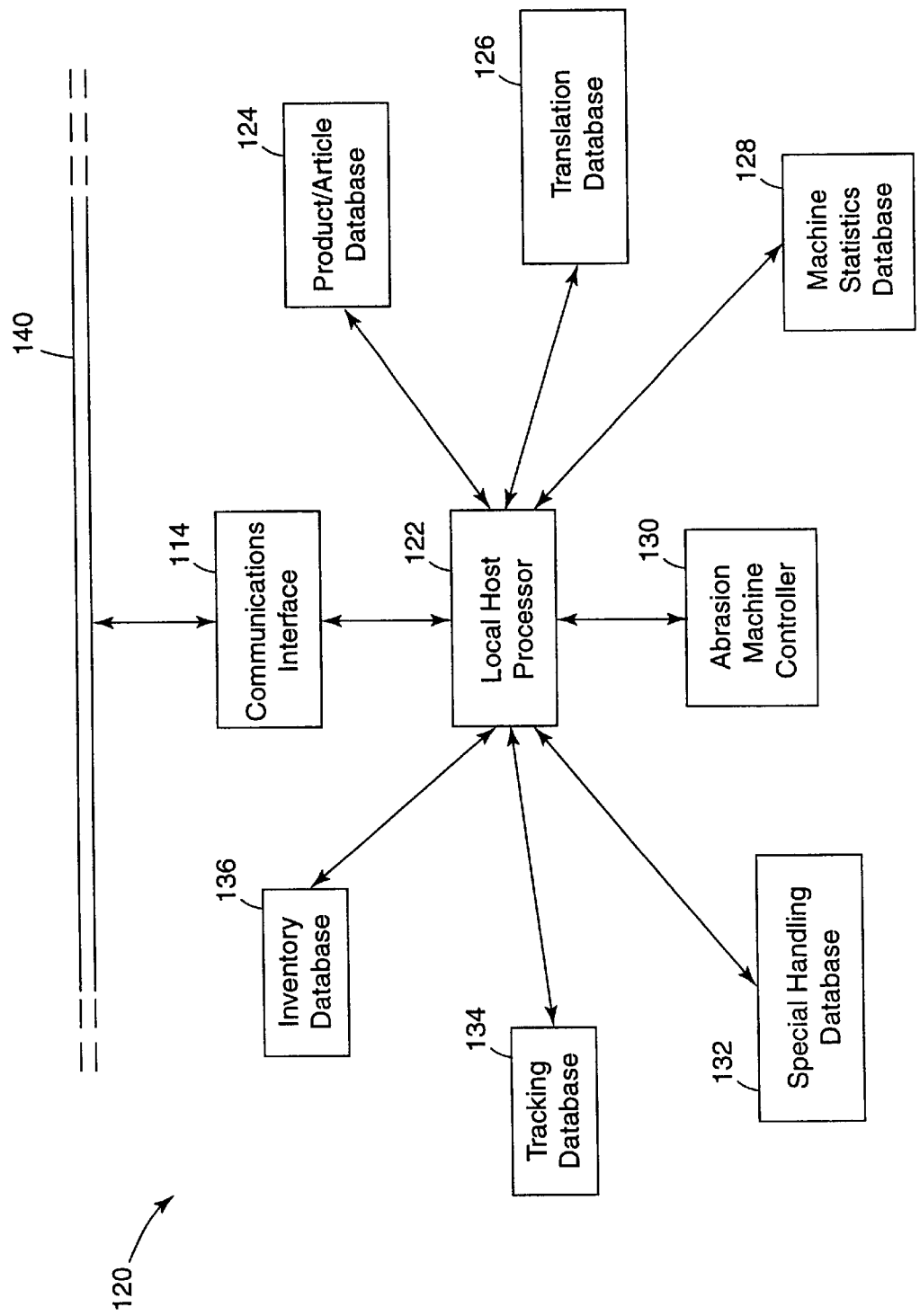
FIG. 8 is an illustration of an information system which includes a processor that communicates with a number of databases for performing a number of data processing tasks in accordance with the principles of the present invention.

In accordance with another embodiment of the present invention, and with reference to FIG. 8, a local host processor 122 processes abrasive processing and product related data acquired, used or generated by an abrasive processing machine. Local host processor 122 may, for example, provide similar functionality as processor 102 shown in FIG. 7 or may be coupled to processor 102 via communications interface 114. Local host processor 122 communicates with a number of databases for performing a number of data processing tasks. The databases depicted in FIG. 8 are representative of only a few of the possible information sources and repositories that may be available to local host processor 122. For example, local host processor 122 may communicate with other information systems and databases via communications interface 114 and communications channel 140.

Figure 9:
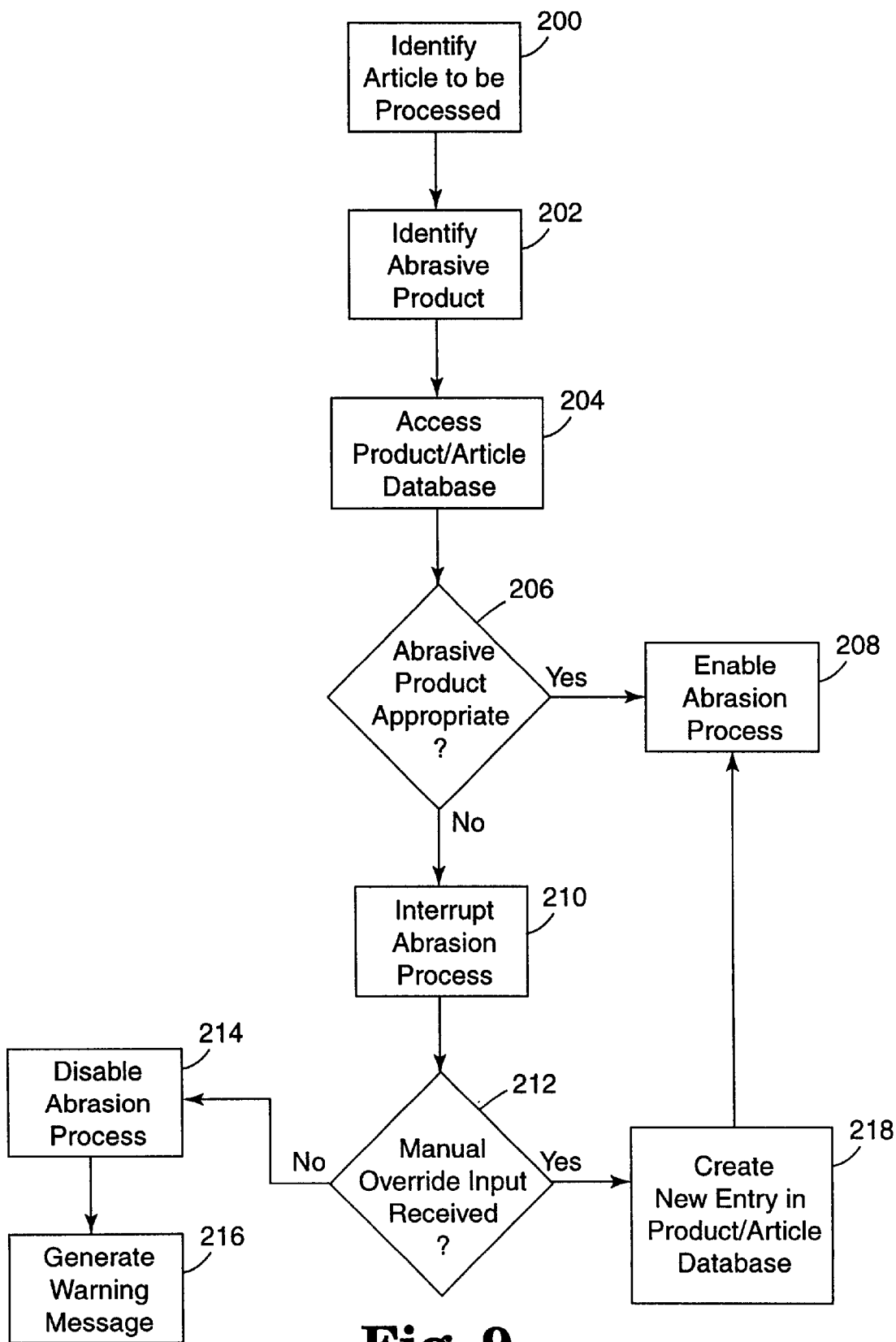
FIG. 9 depicts in flow diagram form several steps concerning an automated process by which only certain abrasive products are used to process certain articles according to an embodiment of the present invention.

Local host processor 122 may communicate with a product/article database 124 in a manner described in flow diagram form in FIG. 9. It may be desirable to automate the process by which only certain abrasive products are used to process certain articles. For example, polishing one or more semiconductor wafers using an inappropriate abrasive product may render the wafers unusable for their intended purpose, often representing a costly loss of material on the order of thousands of dollars per wafer or wafer set. Accordingly, it can be appreciated that avoiding a mismatch of abrasive product and article is important. An abrasive product/article verification methodology depicted in FIG. 9 may be implemented to advantageously avoid occurrences of such undesirable mismatches.

Referring to the flow diagram of FIG. 9, and with continued reference to various components shown in FIGS. 7 and 8, the identity of the article to be subject to abrasive processing is identified 200. Identifying the subject article may be accomplished in a number of ways, including scanning a bar code identifying the subject article, manually inputting the article identification into the product/article database 124 via an input device (e.g., a keyboard, mouse, or voice activated input device), or using other electronic and user actuated means. The abrasive product to be used in processing the subject article is also identified 202, such as by any of the previously discussed automated approaches or by manual input means.

It is assumed that the product/article database 124 includes a lookup table or other database structure that associates article types with acceptable abrasive product types. The product/article database 124 is accessed by local host processor 122 and the abrasive product identity and subject article identity are compared 204, 206 against a lookup table to verify whether processing of the subject article by use of the abrasive product is appropriate. If appropriate, processing of the subject article is enabled 208.

If a mismatch is determined by processor 122, it may be due to a true mismatch or possibly the omission of a new abrasive product or subject article type in the product/article database 124. Regardless of the reason for the mismatch, abrasive processing is halted 210 until the mismatch condition is resolved. A manual override capability may be provided by which an appropriate abrasive product and/or article identity, which has been erroneously omitted from the product/article database 124, is entered 218 using an appropriate input device. If the manual override is successful 212, then the previously omitted abrasive product and/or article identity is entered 218 into the lookup table of the product/article database 124 and abrasive processing is enabled 208. If a mismatch persists, then abrasive processing is disabled 214 and an appropriate warning message is generated 216 for resolution by an operator.

Figure 10:
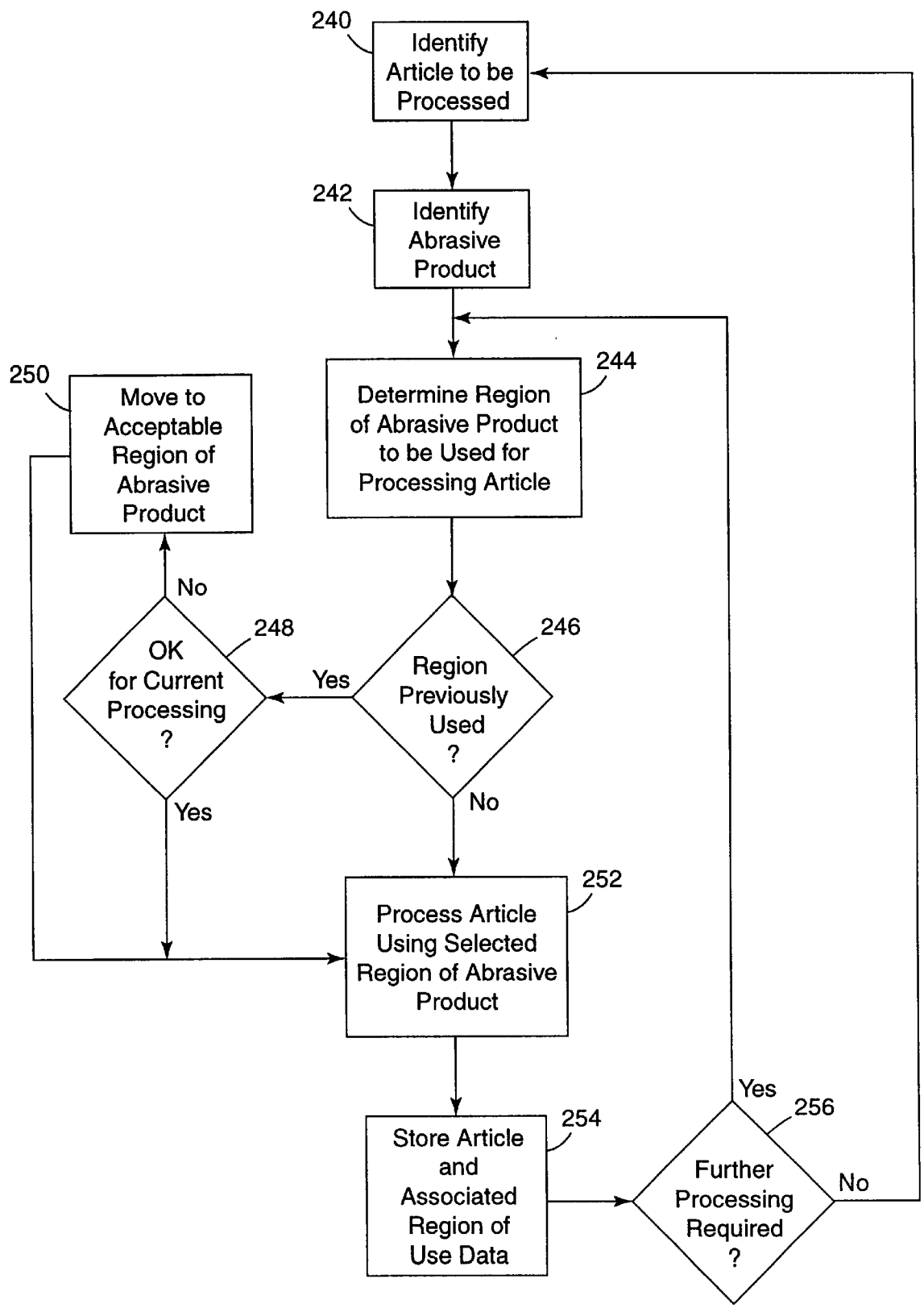
FIG. 10 depicts in flow diagram form several steps concerning an automated process for tracking process related data associated with abrasively processing particular articles according to an embodiment of the present invention.

FIG. 10 illustrates various process steps carried out by processor 122 when tracking process related data associated with abrasively processing a particular article. The system 120 depicted in FIG. 8 includes a tracking database 134 wherein processing related data associated with a given article and one or more abrasive products may be stored and accessed. Initially, the identity of the subject article and abrasive product are obtained 240, 242. Using the information patterned on the abrasive product, and by evaluation of the condition of the article and/or abrasive product, an appropriate region of the abrasive product to be used to process the article is determined 244. Various known techniques, including techniques that employ an ellipsometer, may be employed to determine the condition of the subject article and/or abrasive product.

If the region of intended use has been previously used 246, an evaluation of the suitability of the region is conducted 248. If the region is determined unsuitable, an acceptable region is selected 250. The article is processed 252 as intended using the selected region of the abrasive product. The identity of the article, abrasive product, region of the abrasive product used to treat the article, and other processing related data (e.g., polishing time) is stored in the tracking database 134. If further processing of the article is required 256, such as a second polishing procedure on the same or different apparatus, process steps 244–254 are repeated, although it is understood that step 242 would be repeated if a different abrasive product was to be used to further process the subject article. The data stored in the tracking database 134 may be employed in a number of ways, such as for demonstrating compliance to industry standards (e.g., a relevant ISO standard) and other reliability related uses.

Another aspect of the present invention concerns optimization of an abrasive processing operation through the use of data acquired by local host processor 122 and/or the abrasion machine controller 130 which is stored in one or more databases accessible by local host processor 122. Various process parameters, such as process speed, temperature, abrasive contact pressure, abrasive product tension, etc., associated with a particular article and/or abrasive product may be stored during one or more processing cycles. Other data of interest acquired for a particular process may include processing time and abrasive processing (e.g., planarization) efficiency and quality. The data is preferably acquired automatically, but may also be input using a manual entry approach.

This historical performance data may be used by local host processor 122 to self-optimize an abrasion process, such as a wafer planarization or polishing process. Local host processor 122 may adaptively adjust one or more process parameters to optimize a given abrasion process in terms of processing time and/or processing quality. Adjustments to a given process may be made by local host processor 122 for a currently operating process and for future processes.

Figure 11:
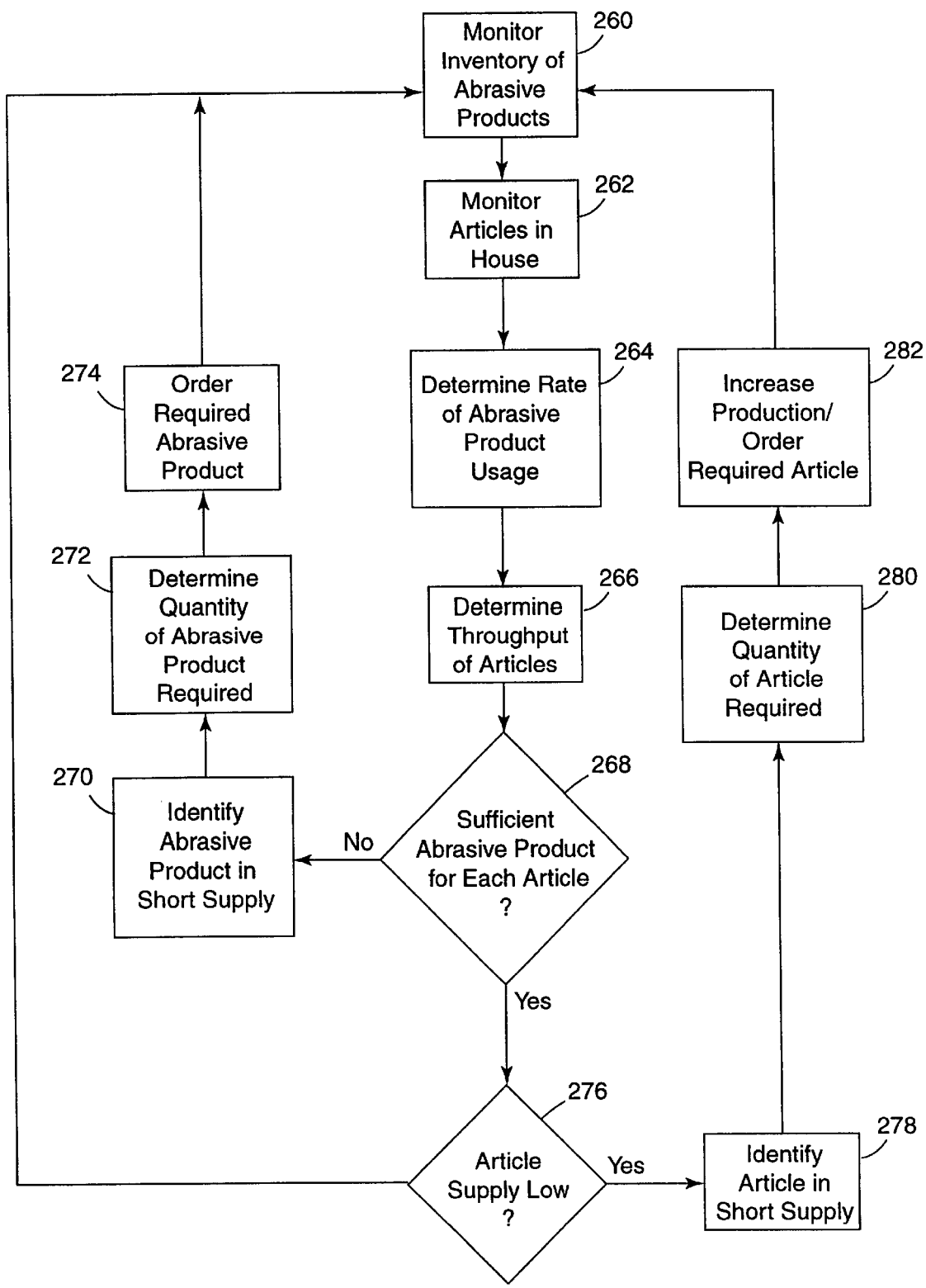
FIG. 11 depicts in flow diagram form several steps concerning an automated process for managing an inventory of abrasive products and articles to be abrasively processed according to an embodiment of the present invention.

With reference to FIG. 11, local host processor 122 also communicates with an inventory database 136 for managing the inventory of abrasive products and articles to be abrasively processed. The inventory database 136 stores data concerning the current stock of abrasive products and subject articles situated at one or more processing facilities. In general, new stock items entering a facility are entered into the inventory database 136. As stock items are consumed, as in the case of abrasive product, or processed, as in the case of articles subjected to abrasive processing, the inventory database 136 is updated, preferably on a real-time basis, to reflect current stock availability and utilization. Processor 122 monitors 260, 262 the inventory levels of abrasive products and articles reflected in the inventory database 136. Processor 122 also monitors 266 the throughput of articles processed at each processing station or apparatus.

A number of functions may be performed by processor 122 when interacting with the inventory database 136. For example, processor 122 may determine 264 the rate of abrasive product usage at one or more processing facilities. Based on a number of factors, including historical data, present orders, and projected future needs, processor 122 may determine 268 whether a sufficient quantity of particular abrasive products is on hand to timely process a given number of specified articles. If processor 122 determines that a current or future shortage of a given abrasive product is occurring or likely to occur, the abrasive products in short supply are identified 270 and the quantity of each needed is determined 272. Processor may further coordinate ordering 274 of the needed abrasive products.

Processor 122 may further query 276 whether particular subject articles are in short supply. If so, the subject articles in short supply are identified 278, the needed quantities of each article are determined 280, and a new supply of the needed articles are acquired 282, such as by ordering or fabricating same.

Local host processor 122 may communicate with other databases, including a machine statistics database 128. Statistics concerning abrasive processing machinery for one or more facilities may be acquired and stored in the machine statistics database 128. Machine parameters of interest may include operating time, downtime due to maintenance and shift changes, processing throughput, machine sensor data, such as abrasive product usage, and other machine related data. Machine and crew performance may be evaluated using the data stored in the machine statistics database 128.

A translation database 126 may be used to store decoding information for a variety of encoded pattern data formats. For example, a particular abrasive processing apparatus may be equipped with multiple reader devices each capable of sensing information patterns of differing types provided on an abrasive product. One reader device, for example, may be configured to read bar codes, while a second reader device may be configured to read alphanumeric indicia. In such a case, the translation database 126 may include a translation table to convert or decode bar codes read by the first reader device to corresponding electrical or optical signals. The translation database 126 may further include a translation table to convert the alphanumeric indicia to a corresponding electronic or ASCII form, such as through use of an optical character recognition algorithm. Other translation tables may be supported, modified, and updated in the translation database 126 to facilitate decoding of information patterns of varying types encoded on the abrasive product.

A special handling database 132 may be accessed by processor 122 to accommodate special handling or operating requirements for a given abrasive product or subject article. An abrasive web, for example, may have certain defects at certain locations identified at the time of manufacture. An information pattern, such as a header of an information frame or separate data block, may be provided on the abrasive web, typically at the start of the web, for purposes of identifying the location of the defects. This defect location information may alternatively be provided on the web core or packaging material. When read, the defect location information is used by the abrasion machine controller 130 to purposely avoid using the defective locations during abrasive processing.

The defect location information, and any other special handling information, may alternatively be transmitted by the abrasive product manufacturer to the local host processor 122 via a communications channel 140 coupled to a communications interface 114. It will be understood that communications interface 114 may be employed to transmit and receive data from any of the databases coupled to, or otherwise accessible by, local host processor 122.

The foregoing description of the various embodiments of the invention has been presented for the purposes of illustration and description. It is not intended to be exhaustive or to limit the invention to the precise form disclosed. Many modifications and variations are possible in light of the above teaching. For example, bar codes, servo codes, periodic markings and the like are well known in the art and may be adapted for use in facilitating abrasive processing control and data acquisition in a manner consistent with the principles of the present invention. The precise nature of the marks will depend on the purpose to be served, and the selection of an appropriate marking system and encoding scheme for each purpose is well within the skill of the ordinary practitioner.

The abrasive product, by way of further example, may have a planer configuration which may take on varying geometries. The abrasive product may be rectangular, circular or elliptical in shape and configured for rectilinear or rotational movement. The abrasive product may also take to the form of a web having a fixed length or, alternatively, may be a continuous web. The web may, for example, constitute a three dimensional, composite, fixed web suitable for planarizing intermediate layers during semiconductor wafer fabrication. The abrasive product may also be used to abrasively process silicon, germanium, gallium arsenide, glass, ceramic, metallic, composite, and wood articles for a wide variety of applications.

Further, the abrasive product may constitute a relatively movable pad and an abrasive slurry. The pad may be moved in a controlled manner relative to the article in accordance with the principles of the present invention, such that the pad and the abrasive slurry abrasively contact the article. The machine discernable pattern provided on the pad may be read subsequent to a cleaning operation. Depending on the configuration of the abrasive processing apparatus, the machine discernable pattern may be read at a first reading location prior to the abrasive product contacting the article and read at a second reading location subsequent to the abrasive product contacting the article.

The abrasive product may also have a composite construction which includes an abrasive layer that may be affixed to a substrate or sub-pad. The sub-pad may be encoded with an information pattern or, alternatively or in addition, the information pattern may be provided on the abrasive layer. The composite abrasive product may be fabricated to include a rigid plate, such as a polycarbonate plate, over which a double-sided adhesive is provided. A backing layer is affixed to the adhesive, and the abrasive material layer is provided on the backing layer. A resilient layer, such as a foam pad, may be affixed to the other side of the rigid plate. The rigid plate provides for localized stiffness of the composite abrasive product, while the resilient pad provides a degree of general compliance.

It is intended that the scope of the invention be limited not by this detailed description, but rather by the claims appended hereto.

What we claim is:

1. A method of abrasively processing an article, comprising:

providing an abrasive product comprising a machine discernable patterns the machine discernable pattern comprising at least a first pattern portion and a second pattern portion, the first pattern portion exhibiting a machine discernable characteristic different from a machine discernable characteristic exhibited by the second pattern portion;

moving the abrasive product relative to the article;

reading the machine discernable pattern; and controlling the movement of the abrasive product relative to the article using the machine discernable pattern.

2. The method of claim 1, wherein reading the machine discernable pattern comprises one or more of electrically, optically, mechanically or magnetically reading the machine discernable pattern.

3. The method of claim 1, wherein the machine discernable pattern comprises one or more of indexing information, servo information, alignment information or abrasive product identification information.

4. The method of claim 1, wherein the machine discernable pattern comprises indexing information, and controlling abrasive product movement comprises computing a location of the abrasive product at which the abrasive product abrasively contacts the article using the indexing information.

5. The method of claim 1, wherein the machine discernable pattern comprises servo information, and controlling abrasive product movement comprises controlling a rate at which the abrasive product moves relative to the article using the servo information.

6. The method of claim 1, wherein the machine discernable pattern comprises servo information, and controlling abrasive product movement comprises controlling a direction of abrasive product movement relative to the article using the servo information.

7. The method of claim 1, wherein the machine discernable pattern comprises alignment information, and controlling abrasive product movement comprises controlling alignment of the abrasive product relative to the article using the alignment information.

8. The method of claim 1, wherein the machine discernable pattern comprises abrasive product identification information, the method further comprising verifying that the abrasive product is appropriate for abrasively processing the article.

9. The method of claim 8, wherein controlling abrasive product movement comprises disabling movement of the abrasive product in response to a failure to verify that the abrasive product is appropriate for abrasively processing the article.

10. The method of claim 1, wherein the machine discernable pattern comprises at least one of a machine discernable electrical characteristic, optical characteristic, topographic characteristic or magnetic characteristic.

11. The method of claim 1, wherein the machine discernable pattern comprises one or more of indicia, protrusions, depressions, notches, holes, voids, color or pigment variations, bar codes, magnetic transitions or periodic markings.

12. The method of claim 1, wherein reading the machine discernable pattern comprises information identifying a location of one or more defective regions of the abrasive product, and controlling the movement of the abrasive product comprises controlling abrasive product movement so as to avoid contact between the defective regions and the article using the defect identification information.

13. The method of claim 1, wherein the abrasive product comprises one of a pad and an abrasive slurry, a lapping or burnishing film, or a textured web.

14. The method of claim 1, wherein reading the machine discernable pattern further comprises reading the machine discernable pattern at a first reading location prior to the abrasive product contacting the article and reading the machine discernable pattern at a second reading location subsequent to the abrasive product contacting the article.

15. The method of claim 1, wherein the article comprises a silicon article, a germanium article, a gallium arsenide article, a glass article, a ceramic article, a composite article, a wood article or a metallic article.

16. The method of claim 1, wherein the article comprises a semiconductor wafer.

17. The method of claim 1, further comprising optimizing a parameter of the abrasive processing method.

18. The method of claim 17, wherein the parameter comprises one or more of abrasive product speed, temperature, tension or contact pressure defined between the abrasive product and the article.

19. An abrasive product for abrasively processing an article, comprising:
   a base layer having a first surface and a second surface;
   an abrasive material disposed on the first surface; and
   a machine discernable pattern provided on either one or both of the first surface or the second surface for use in generating a control signal for controlling movement of the abrasive material relative to the article.

20. The product of claim 19, wherein the machine discernable pattern comprises a machine discernable electrical characteristic, optical characteristic, topographic characteristic or magnetic characteristic.

21. The product of claim 19, wherein the machine discernable pattern comprises indicia provided on either one or both of the first surface or the second surface.

22. The product of claim 19, wherein the machine discernable pattern comprises either one or more of protrusions, depressions or notches provided on either one or both of the first surface or the second surface.

23. The product of claim 19, wherein the machine discernable pattern comprises bar coding.

24. The product of claim 19, wherein the machine discernable pattern comprises servo information.

25. The product of claim 19, wherein the machine discernable pattern comprises indexing information.

26. The product of claim 19, wherein the machine discernable pattern comprises abrasive product identification information.

27. The product of claim 19, wherein the machine discernable pattern comprises at least a first pattern portion and a second pattern portion, the first pattern exhibiting a machine discernable characteristic different from a machine discernable characteristic exhibited by the second pattern portion.

28. The product of claim 27, further comprising one or more tabs affixed to the abrasive product, wherein the first pattern portion is provided on either one or both of the first surface or the second surface, and the second pattern portion is provided on one or more of the tabs.

29. The product of claim 19, wherein the second surface is oriented substantially parallel to the first surface.

30. The product of claim 19, wherein the second surface is oriented substantially orthogonal to the first surface.

31. The product of claim 19, wherein the abrasive product has a continuous web configuration, a belt-type configuration or a discrete plate-like configuration.

32. The product of claim 19, wherein the abrasive product comprises one of a pad and an abrasive slurry, a lapping or burnishing film, or a textured web.

33. The product of claim 19, wherein the machine discernable pattern is provided on a label affixable to either one or both of the first surface or the second surface.

34. An apparatus for abrasively processing an article, comprising:
   a support for supporting an abrasive product, the abrasive product comprising one of a pad and an abrasive slurry, a lapping or burnishing film, or a textured web, the abrasive product further comprising a machine discernable pattern;
   a mounting fixture for positioning the article into and out of contact with the abrasive product;
   an actuator for moving the abrasive product relative to the article;
   a detector that detects the machine discernable pattern; and
   a controller that controls the movement of the abrasive product relative to the article using the machine discernable pattern.

35. The apparatus of claim 34, wherein the detector comprises one or more of an electrical detector, an optical detector, a mechanical detector or a magnetic detector.

36. The apparatus of claim 34, wherein the detector detects one or more of indexing information, servo information, alignment information or abrasive product identification information provided in the machine discernable pattern.

37. The apparatus of claim 34, wherein the machine discernable pattern comprises indexing information, and the controller computes a location of the abrasive product at which the abrasive product abrasively contacts the article using the indexing information.

38. The apparatus of claim 34, wherein the machine discernable pattern comprises servo information, and the controller controls a rate at which the abrasive product moves relative to the article using the servo information.

39. The apparatus of claim 34, wherein the machine discernable pattern comprises servo information, and the controller controls a direction of abrasive product movement relative to the article using the servo information.

40. The apparatus of claim 34, wherein the machine discernable pattern comprises alignment information, and the controller controls alignment of the abrasive product relative to the article using the alignment information.

41. The apparatus of claim 34, wherein the machine discernable pattern comprises abrasive product identification information, and the controller verifies that the abrasive product is appropriate for abrasively processing the article prior to moving the abrasive product so as to contact the article.

42. The apparatus of claim 34, wherein the machine discernable pattern comprises information identifying a location of one or more defective regions of the abrasive product, and the controller controls abrasive product movement so as to avoid contact between the defective regions and the article using the defect identification information.

43. The apparatus of claim 34, wherein the article comprises a silicon article, a germanium article, a gallium arsenide article, a glass article, a ceramic article, a composite article, a wood article or a metallic article.

44. The apparatus of claim 34, wherein the article comprises a semiconductor wafer.

45. A method of acquiring information associated with processing of an article by use of an abrasive processing apparatus, the method comprising:
   providing an abrasive product comprising a machine discernable pattern;
   reading the machine discernable pattern;
   obtaining, from a database, an identification of the abrasive product using the machine discernable pattern;

producing data associated with processing of the article by use of the identified abrasive product;

storing the data in the database;

identifying the article to be processed using the abrasive processing apparatus; and verifying, using the database, the appropriateness of processing the identified article using the identified abrasive product.

46. The method of claim 45, wherein identifying the article comprises accessing the database to identify the article.

47. The method of claim 46, wherein identifying the article comprises manually or electronically inputting the article identification into the database.

48. The method of claim 45, further comprising disabling processing of the identified article by use of the identified abrasive product in response to unsuccessfully verifying the appropriateness of processing the identified article using the identified abrasive product.

49. The method of claim 45, wherein producing data comprises producing data associated with a location of the identified abrasive product at which the article was processed.

50. The method of claim 45, wherein producing data comprises producing inventory data associated with one or both of the identified abrasive product or the article.

51. The method of claim 45, wherein producing data comprises producing statistics associated with processing of one or more articles using the identified abrasive product.

52. The method of claim 45, wherein producing data comprises producing data associated with a throughput of articles processed using the identified abrasive product.

53. The method of claim 45, further comprising communicating processing data stored in the database to a remotely located processor.

54. A system for acquiring information concerning processing of an article by use of an abrasive processing apparatus, comprising:

a controller coupled to the abrasive processing apparatus;

a detector, coupled to the controller, that detects a machine discernable pattern provided on an abrasive product used by the abrasive processing apparatus to abrasively process the article;

a host processor coupled to memory; and an interface that couples the host processor to the controller of the abrasive processing apparatus, the host processor receiving identification information associated with the abrasive product from the controller and storing the abrasive product identification information in the memory.

55. The system of claim 54, wherein either the host processor or the controller converts the machine discernable pattern to a corresponding abrasive product identity using the abrasive product identification information.

56. The system of claim 55, wherein the host processor is situated remotely with respect to the controller.

57. The system of claim 54, wherein the memory comprises a plurality of physical or virtual memory devices, each of the memory devices situated proximately or remotely with respect to other ones of the memory devices.

58. The system of claim 54, wherein an identity of the article to be processed using the abrasive processing apparatus is stored in the memory, and the host processor associates the article identity with the abrasive product identification information to verify the appropriateness of processing the article using the abrasive product.

59. The system of claim 58, wherein the host processor communicates a disable signal to the controller in response to unsuccessfully verifying the appropriateness of processing the article using the abrasive product, the controller disabling processing of the article in response to the disable signal.

60. The system of claim 54, further comprising an input device, the article identity being input into the memory using the input device.

61. The system of claim 60, where the input device comprises a keyboard, a voice recognition device, an optical scanning device, or a bar code reader.

62. The system of claims 54, wherein the controller produces data associated with a location of the identified abrasive product at which the article was processed, the controller communicating the data to the host processor.

63. The system of claim 54, wherein the controller produces inventory data associated with one or both of the identified abrasive product or the article.

64. The system of claim 54, wherein the controller produces statistics associated with processing of one or more articles using the abrasive product.

65. The system of claim 54, wherein the controller produces data associated with a throughput of articles processed using the abrasive product.

66. A method of abrasively processing an article, comprising:

providing an abrasive product comprising a machine discernable pattern, the abrasive product comprising one of a pad and an abrasive slurry, a lapping or burnishing film, or a textured web;

moving the abrasive product relative to the article;

reading the machine discernable pattern; and controlling the movement of the abrasive product relative to the article using the machine discernable pattern.

67. The method of claim 66, wherein reading the machine discernable pattern comprises one or more of electrically, optically, mechanically or magnetically reading the machine discernable pattern.

68. The method of claim 66, wherein the machine discernable pattern comprises one or more of indexing information, servo information, alignment information or abrasive product identification information.

69. The method of claim 66, wherein the machine discernable pattern comprises indexing information, and controlling abrasive product movement comprises computing a location of the abrasive product at which the abrasive product abrasively contacts the article using the indexing information.

70. The method of claim 66, wherein the machine discernable pattern comprises servo information, and controlling abrasive product movement comprises controlling a rate at which the abrasive product moves relative to the article using the servo information.

71. The method of claim 66, wherein the machine discernable pattern comprises servo information, and controlling abrasive product movement comprises controlling a direction of abrasive product movement relative to the article using the servo information.

72. The method of claim 66, wherein the machine discernable pattern comprises alignment information, and controlling abrasive product movement comprises controlling alignment of the abrasive product relative to the article using the alignment information.

73. The method of claim 66, wherein the machine discernable pattern comprises abrasive product identification information, the method further comprising verifying that the abrasive product is appropriate for abrasively processing the article.

74. The method of claim 73, wherein controlling abrasive product movement comprises disabling movement of the abrasive product in response to a failure to verify that the abrasive product is appropriate for abrasively processing the article.

75. The method of claim 66, wherein the machine discernable pattern comprises at least one of a machine discernable electrical characteristic, optical characteristic, topographic characteristic or magnetic characteristic.

76. The method of claim 66, wherein the machine discernable pattern comprises one or more of indicia, protrusions, depressions, notches, holes, voids, color or pigment variations, bar codes, magnetic transitions or periodic markings.

77. The method of claim 66, wherein the machine discernable pattern comprises at least a first pattern portion and a second pattern portion, the first pattern portion exhibiting a machine discernable characteristic different from a machine discernable characteristic exhibited by the second pattern portion.

78. The method of claim 66, wherein reading the machine discernable pattern comprises information identifying a location of one or more defective regions of the abrasive product, and controlling the movement of the abrasive product comprises controlling abrasive product movement so as to avoid contact between the defective regions and the article using the defect identification information.

79. The method of claim 66, wherein reading the machine discernable pattern further comprises reading the machine discernable pattern at a first reading location prior to the abrasive product contacting the article and reading the machine discernable pattern at a second reading location subsequent to the abrasive product contacting the article.

80. The method of claim 66, wherein the article comprises a silicon article, a germanium article, a gallium arsenide article, a glass article, a ceramic article, a composite article, a wood article or a metallic article.

81. The method of claim 66, wherein the article comprises a semiconductor wafer.

82. The method of claim 66, further comprising optimizing a parameter of the abrasive processing method.

83. The method of claim 82, wherein the parameter comprises one or more of abrasive product speed, temperature, tension or contact pressure defined between the abrasive product and the article.

* * * * *